United States Patent [19]

Baffreau et al.

[11] Patent Number: 5,207,832
[45] Date of Patent: May 4, 1993

[54] LIGHTENED CEMENT GROUT SUITABLE FOR THE CEMENTATION OF HYDROCARBON PRODUCTION WELLS

[75] Inventors: Daniel Baffreau, Saint-Maur-des-Fosses; Jean-Claude Laugerotte, Paris; Nicolas Musikas, Essigny le Petit, all of France

[73] Assignees: Total Compagnie Francaise des Petroles, Puteaux; Ciments d'Origny, Paris, both of France

[21] Appl. No.: 743,406

[22] PCT Filed: Feb. 12, 1990

[86] PCT No.: PCT/FR90/00099
§ 371 Date: Oct. 11, 1991
§ 102(e) Date: Oct. 11, 1991

[87] PCT Pub. No.: WO90/09357
PCT Pub. Date: Aug. 23, 1990

[30] Foreign Application Priority Data
Feb. 14, 1989 [FR] France .................. 89 01881

[51] Int. Cl.$^5$ ............... C04B 14/00; C04B 16/00
[52] U.S. Cl. ............................. 106/727; 106/737
[58] Field of Search ............. 106/724, 721, 727, 726, 106/719, 737; 252/8.551

[56] References Cited

U.S. PATENT DOCUMENTS

| | | | |
|---|---|---|---|
| 3,491,049 | 1/1970 | Gibson et al. | 260/29.2 |
| 4,125,160 | 11/1978 | Crinkelmeyer et al. | 166/293 |
| 4,131,578 | 12/1978 | Crinkelmeyer et al. | 260/17.5 |
| 4,413,681 | 11/1983 | McKenzie | 166/293 |
| 4,482,381 | 11/1984 | Spitz et al. | 106/90 |
| 4,482,383 | 11/1984 | McKenzie | 106/90 |
| 4,532,052 | 7/1985 | Weaver et al. | 252/8.55 R |
| 4,569,694 | 2/1986 | Spitz et al. | 106/314 |

FOREIGN PATENT DOCUMENTS

2569759 3/1986 France .
2587988 7/1986 France .

Primary Examiner—Mark L. Bell
Assistant Examiner—Alan Wright
Attorney, Agent, or Firm—Sughrue, Mion, Zinn, Macpeak & Seas

[57] ABSTRACT

This invention relates to a lightened gas-impermeable cement grout which comprises hydraulic cement, water, silica fumes in an amount of from about 5 to about 65 weight % based on the weight of the cement, and at least one polyethylene imine having a molecular weight of between about 600,000 and about 1,000,000 in an amount of from about 1 to about 25% weight % based on the weight of the water.

28 Claims, 11 Drawing Sheets

LIGHTENED CEMENT GROUT SUITABLE FOR THE CEMENTATION OF HYDROCARBON PRODUCTION WELLS

FIELD OF THE INVENTION

The present invention concerns compositions termed "cement slag" by petroleum engineers and "cement grout" by concrete workers but will be referred to as "cement grout" hereinafter. More particularly, the present invention relates to a lightened cement grout which is suitable for the cementation of natural hydrocarbon production wells (petroleum or gas).

BACKGROUND OF THE INVENTION

Cementation of natural hydrocarbon production wells is performed between the external part of the casing and the wall of the well to support the entire series of tubes and to prevent the flow of pressurized liquid or fluid originating in the subterranean strata in which drilling occurs.

It is especially important that the cement used for this purpose exhibits, after hardening, rapid and pronounced resistance to compression in order to possess satisfactory mechanical properties. Furthermore, it is often necessary that these cements are gas-impermeable in order to effectively block the flow of highly-pressurized gases which may be present in the drilled strata and which may travel through the cement, even as the cement hardens.

However, frequently, the drilled strata exhibit a mechanical strength which is too weak to allow the use of cements having a high density, i.e., of approximately 1.6 to 1.9 g/cm$^3$. In this case, recourse must be made to cements termed "lightened," i.e., whose density ranges between 1 and 1.6 g/cm$^3$ and in which inert or active lightening filling materials are incorporated.

The state of the art has proposed numerous types of filling materials. For example, the use of hollow glass microspheres containing air or an inert gas has been suggested. However, these filling materials pose serious risks for pumps and injection systems, since they may burst or implode. Furthermore, the real density of the cement grout is difficult to adjust. Finally, these lightening products are costly.

Silicates have also been proposed as lightening filling materials, but these compounds have a low compression resistance.

Finally, incorporating compounds capable of producing a gas in situ, which forms bubbles in these compounds, into the cement grout has also been contemplated. This solution can plausibly be considered for areas where the depth is slight. However, this procedure is more costly and is difficult to implement because the diameter of the ga bubbles cannot be controlled effectively and the bubbles promote the cracking of the cement.

In any case, the gas-impermeability of the cements lightened by these means poses serious problems for which solutions have long been sought.

Patent No. FR-A-2587988 proposes the use of, in a hydraulic cement slag containing light aggregates as a lightening filling material, such as hollow microspheres, an impermeability agent formed by particles of silica powder accounting for between 5 and 100% by weight of the hydraulic cement. These silica particles may be secondary products originating in electric ovens used for the production of silicon or ferrosilicon.

SUMMARY OF THE INVENTION

The present invention concerns lightened cement grouts containing fine silica particles, and represents an improvement in the compression resistance of cements obtained from these grouts and eliminates or limits their shrinkage.

Accordingly, one purpose of the invention is to achieve lightened cement grouts having a density of between 1.20 and 1.70, high mechanical performance levels, and whose compression resistance, which, in particular, varies as a function of density, which reaches and surpasses 15 MPa for a density of 1.40, and 30 Mpa for a density of 1.60, after 24 hours and at a temperature of 60° C.

Another purpose of the invention is to provide a lightened cement grout which is impermeable to gas, even when highly pressurized, when it is put in place in a petroleum well.

A further purpose of the invention is to provide a lightened cement grout which is compatible with conventionally-used additives.

Another object of the invention is to provide a lightened cement grout capable of being used at high temperature (above 110° C.) without adding a siliceous additive, which is a product habitually used to prevent reduced mechanical resistance, a phenomenon observed when using Portland-type cements.

A further object of the invention is to provide a lightened cement grout whose rheological properties approximate those of conventional cement grouts and thus permit its injection and installation in hydrocarbon wells using conventional methods according to the state of the art.

In addition, the present invention provides a process for producing a lightened cement grout as described above.

The above and other objects and advantages of the present invention are attained by a lightened, gas-impermeable cement grout which comprises a hydraulic cement, water, silica fumes in an amount of from about 5 to about 65 weight % based on the weight of the cement, and at least one polyethylene imine having a molecular weight of between about 600,000 and about 1,000,000 in an amount of from about 1 to about 25 weight % based on the weight of the water.

The present invention also relates to a process for preparing the above-described lightened, gas-impermeable cement grout comprising the following steps in succession:

a) combining at least one polyethylene imine with water, wherein the at least one polyethylene imine has a molecular weight of between about 600,000 and about 1,000,000 and is used in an amount of from about 1 to about 25 weight % of the weight of the water, to form a water/polyethylene imine mixture;

b) adding silica fumes in an amount of from about 5 to about 65 weight % based on the weight of the cement to be added in following step (c), to the water/polyethylene imine mixture to form a suspension;

c) mixing hydraulic cement into the suspension.

Still another aspect of the present invention relates to a process for cementation of a hydrocarbon well using the lightened, gas-impermeable cement grout described above, comprising injecting the grout into the well, at the periphery of the tubes and over at least one portion of the length of these tubes, between the latter and the adjoining ground.

DETAILED DESCRIPTION OF THE INVENTION

In contrast to the previous state-of-the-art disclosures mentioned above, the present invention does not use silica microparticles as the impermeability agent of the cement, as disclosed in French Patent Application No. FR-A-2569759, but rather as the lightening filling material of the grout. In the present invention, the impermeability-inducing function is performed by polyethylene imine, and polyethylene imine also acts a plasticizer within the cement grout.

For the purposes of the present invention, the term "silica fumes" means microparticles recovered in the fumes emitted by electric ovens used for manufacture of silicon and its alloys, especially ferrosilicons having a silica content of approximately 85 to 98%. These particles have a maximum size of between about 0.01 microns and about 1 micron, with an average size of several tenths of microns and a specific surface area of between about 15 and about 25 m$^2$/g. Further, in use, some of these particles may be joined together in order to form small masses.

In the grout composition, the cement can be of any type conventionally used in petroleum drilling operations. Most frequently, this will be an artificial Portland cement.

Use may be made of either fresh or sea water to prepare the lightened grout according to the present invention, the exact proportions of the various constituents being simply adjusted as a function of the type of water used in a manner which would be well understood by one of ordinary skill in the art.

The polyethylene imine is preferably incorporated as an aqueous solution.

Since it is very difficult to handle silica fumes in a raw state because the fumes have a very low density and are volatile, the fumes are advantageously used as a stable suspension, e.g., containing about 50% by weight of silica, either in a compressed form created by vibration or under pressure, while reducing, for example, the apparent volume of the fumes by a factor of 2.5.

The cement grout composition according to the present invention naturally may contain any conventional additives known to be useful in cement grouts.

In the process of the invention, the polyethylene imine is preferably incorporated into the water in the presence of an anti-foaming product. In addition, additives, such as dispersing and retarding agents, are preferably incorporated into the mixture. These additives are preferably added to the suspension formed upon incorporating silica fumes into the water/polyethylene imine mixture, and prior to mixing in the hydraulic cement. The process according to the invention desirably avoids flocculation of the silica fumes when the polyethylene imine is added.

The process of the present invention may be easily implemented at the work site at a modest cost which is generally lower than those procedures used according to the state of the art.

The composition of the invention can also be advantageously used for cementation of a hydrocarbon product well wherein the cement grout is injected into the well, at the periphery of the tubes of the well and over at least one portion of the length of these tubes between these tubes and the adjoining ground.

Grout compounds according to the present invention, in order to achieve better resistance to compression in relation to the density sought, preferably contain silica fumes with a weight % between 30% and 65%, and more preferably between 25% and 40% based on the weight of the cement and polyethylene imine with a weight % of 5% to 15% based on the weight of the water.

For example, a cement grout comprising Portland cement, 30% silica fumes, based on the weight of the cement, water, and 10% polyethylene imine, based on the weight of the water, exhibits a resistance to compression of 16 Mpa (i.e., 2,300 p.s.i.), which is a completely remarkable result. Similarly, a compound comprising Portland cement, 35% silica fumes, based on the weight of the cement, water, and 15% polyethylene imine, based on the weight of the water, exhibits a resistance to compression of 17 Mpa, or 2,400 p.s.i.

The following examples are merely illustrative of the present invention and are not to be considered as restrictive in nature. These examples illustrate the advantages of the lightened cement grout prepared in accordance with the present invention as compared to those of prior art, and highlight physical properties of the cement grout of the present invention.

In all of the examples provided below, the polyethylene imine has a molecular weight of 800,000 and is used as an aqueous solution containing 33% by weight of polyethylene imine.

EXAMPLES

Example 1

Two lightened cement grouts are prepared, the first, $A_1$, as a comparative example representative of the prior art, and the second, $B_1$, in accordance with the present invention, each having a density of 1.4. Cement G used in the following Examples is a well known hydraulic well cement described, for example, in *American Petroleum Institute*, Part 10, Materials and Testing For Well Cements.

| Composition of $A_1$ | |
|---|---|
| Cement G: | 411 g |
| Bentonite (incorporated dry into the cement): | 4 g |
| Glass microspheres: | 102 g |
| Dispersant: | 0.7 ml |
| Water retention agent: | 2 g |
| Retardant: | 0.9 ml |
| Fresh water: | 322 ml |
| Composition of $B_1$ | |
| Cement G: | 267 g |
| Silica fume suspension: | 232 g |

| -continued | |
|---|---|
| Polyethylene imine: | 46 ml |
| Dispersant: | 5 g |
| Retardant: | 4 g |
| Fresh water: | 291 ml. |

The two cement grouts were tested according to the conditions of cementation of a casing of from 9⅝" to 2,650 m.

The results of the tests were as follows:

Pumpability or grout-installation simulation time:
  Grout $A_1$: 408 minutes
  Grout $B_1$: 247 minutes Filtration time in accordance with the API standard:
  Grout $A_1$: 282 ml/30 minutes
  Grout $B_1$: 16 ml/30 minutes Resistance to compression after 24 and 48 hours at 63° C. under simulated pressure of 2,500 p.s.i. (17.50 Mpa):
  Grout $A_1$: 3 Mpa (525 p.s.i.) and 8.9 Mpa (1,300 p.s.i.)
  Grout $B_1$: 19.8 Mpa (2,870 p.s.i.) and 28.2 Mpa (4,080 p.s.i.).

In this latter test for Grout $A_1$, a reduction of volume of the manufactured specimens and an increase in the measured density of the grout (1.50 as against 1.40) were observed.

Example 2

Two lightened cement grouts, the first, $A_2$, as a comparative example of a conventional type and the second, $B_2$, in accordance with the present invention, were prepared, each having a density of 1.4.

| Composition of $A_2$ | |
|---|---|
| Cement G: | 409 g |
| Bentonite: | 4 g |
| Hollow glass microspheres: | 102 g |
| Water retention agent: | 2 g |
| Dispersant: | 0.7 ml |
| Retardant: | 0.9 ml |
| Fresh water | 322 ml |
| Composition of $B_2$ | |
| Cement G: | 285 g |
| Silica fumes: | 85 g |
| Polyethylene imine: | 47 ml |
| Fresh water: | 423 ml. |

The cement grouts obtained were tested at 52° C. under 9.6 MPa (1,400 p.s.i.) after 24, 48, and 72 hours, respectively.

The results are illustrated in Table I:

TABLE I

| | Resistance to Compression | | |
|---|---|---|---|
| Composition | After 24 hours: | After 48 hours: | After 72 hours: |
| Composition $A_2$ | 4.2 MPa (608 p.s.i.) | 8.9 MPa (1,300 p.s.i.) | 9.5 MPa (1,380 p.s.i.) |
| Composition $B_2$ | 7.7 MPa (1,120 p.s.i.) | 12.3 MPa (1,780 p.s.i.) | 13.3 MPa (1,930 p.s.i.) |

These results show that the resistance to compression of the lightened cement grout $B_2$, in accordance with the present invention, is much greater than that of the lightened cement grout $A_2$, as a comparative example.

The filtrate obtained using these two cement grouts at 52° C., under a pressure of 6.9 MPa (1,000 p.s.i.) for 30 minutes (standard test) was also determined.

Using cement grout $A_2$, 282 ml of filtrate was obtained, which is an amount far greater than the upper limit of 100 ml which is considered to be a poor result, whereas using cement grout $B_2$, 78 ml of filtrate were collected.

Example 3

Three other conventional lightened cement grouts, $H_1$, $H_2$, and $H_3$, containing, respectively, bentonite, prehydrated bentonite, and silicate of sodium carbonate, as well as a cement grout according to the present invention, $H_4$, were prepared. These four cement grouts had a density of 1.4.

| Composition of $H_1$: | |
|---|---|
| Cement G: | 285 g |
| Bentonite: | 71 g |
| Fresh water: | 483 ml |
| Composition of $H_2$: | |
| Cement G: | 332 g |
| Bentonite: | 20 g |
| Fresh water: | 488 ml |
| Composition of $H_3$: | |
| Cement G: | 323 g |
| Silicate of sodium carbonate: | 17.0 ml |
| Sea water: | 481 ml |
| Composition of $H_4$: | |
| Cement G: | 273 g |
| Silica fumes: | 109 g |
| Polyethylene imine: | 45 ml |
| Fresh water: | 414 ml |

The resistance to compression of the four cement grouts was tested after 24 hours at a temperature of 60° C. at atmospheric pressure.

The results are illustrated in Table II.

TABLE II

| Composition | Resistance to compression |
|---|---|
| $H_1$ | 0.62 MPa (90 p.s.i.) |
| $H_2$ | 1.1 MPa (160 p.s.i.) |
| $H_3$ | 1.35 MPa (190 p.s.i.) |
| $H_4$ | 14 MPa (2,010 p.s.i.) |

The filtrates obtained using these different cement grouts at 52° C. under a pressure of 6.9 MPa (1,000 p.s.i.) after 30 minutes were also determined.

The results are illustrated in Table III.

TABLE III

| Composition | Filtrate (30 minutes) |
|---|---|
| $H_1$ | >100 ml |
| $H_2$ | >100 ml |
| $H_3$ | >100 ml |
| $H_4$ | 82 ml |

These results show, once again, the clear superiority of the cement grout according to the present invention.

EXAMPLE 4

Cement grouts having a density of 1.58 and based on prehydrated bentonite (composition $D_1$), silicate of sodium bicarbonate (composition $D_2$), and a cement grout in accordance with the present invention (composition $D_3$) were prepared.

| COMPOSITION D₁ | |
| --- | --- |
| Cement G: | 504 g |
| Prehydrated bentonite: | 10.1 g |
| Fresh water: | 435 ml |
| COMPOSITION D₂ | |
| Cement G: | 485 g |
| Silicate of sodium carbonate (0.36 g/s): | 15.5 ml |
| Sea water: | 430 ml |
| COMPOSITION D₃ | |
| Cement G: | 413 g |
| Silica fumes: | 145 g |
| Polyethylene imine: | 40 ml |
| Fresh water: | 362 ml |

The resistance to compression of the three cement grouts was tested after 24 hours at a temperature of 60° C. and at atmospheric pressure.

The following results were obtained:

| Composition D₁: | 7.98 MPa (1,160 p.s.i.) |
| --- | --- |
| Composition D₂: | 7.49 MPa (1,090 p.s.i.) |
| Composition D₃: | 31.4 MPa (4,550 p.s.i.) |

These results show that the resistance to compression of the lightened cement grout $D_3$ as representative of the present invention is markedly superior to that of the lightened cement grouts $D_1$ and $d_2$.

EXAMPLE 5

Cement grouts having a density of 1.20 and containing fresh or sea water with various silica fumes contents were prepared in accordance with the present invention as set forth below.

| Composition E₁ | |
| --- | --- |
| Cement G: | 131 g |
| Silica fumes suspension (containing 50% silica fumes) | 92 g |
| Polyethylene imine | 75 ml |
| Fresh water: | 416 ml |
| Dispersant: | 2 g |
| Composition E₂ | |
| Cement G: | 120 g |
| Silica fumes suspension (containing 50% silica fumes) | 120 g |
| Polyethylene imine | 74 ml |
| Fresh water: | 400 ml |
| Dispersant: | 1.8 g |
| Composition E₃ | |
| Cement G: | 116 g |
| Silica fumes suspension | 82 g |
| Polyethylene imine | 82 ml |
| Sea water: | 422 ml |
| Dispersant: | 1.7 g |
| Composition E₄ | |
| Cement G: | 107 g |
| Silica fumes suspension | 107 g |
| Polyethylene imine | 81 ml |
| Sea water: | 406 ml |
| Dispersant: | 1.5 g |

The resistance to compression of these compositions after 24 and 72 hours, respectively, and at a temperature of 60° C. are illustrated in the Table IV below:

TABLE IV

| Composition | 24 hours | 72 hours |
| --- | --- | --- |
| E₁ | 2.24 MPa (325 p.s.i.) | 3.30 MPa (478 p.s.i.) |
| E₁ | 3.17 MPa (460 p.s.i.) | 4.78 MPa (693 p.s.i.) |
| E₃ | 2.80 MPa (406 p.s.i.) | 3.64 MPa (527 p.s.i.) |
| E₄ | 3.75 MPa (543 p.s.i.) | 5.252 MPa (761 p.s.i.) |

EXAMPLE 6

Cement grouts having a density of 1.30 and containing fresh or sea water were prepared in accordance with the present invention as set forth below.

| Composition F₁ | |
| --- | --- |
| Cement G: | 201 g |
| Silica fumes: | 81 g |
| Polyethylene imine | 50 ml |
| Fresh water: | 449 ml |
| Dispersant: | 4 g |
| Composition F₂ | |
| Cement G: | 184 g |
| Silica fumes: | 74 g |
| Polyethylene imine | 50 ml |
| Sea water: | 457 ml |
| Dispersant: | 3.7 g |

The resistance to compression of the two cement grouts was tested after 24 hours at a temperature of 60° C. and at atmospheric pressure. The results are set forth below.

| Composition F₁: | 5.2 MPa (755 p.s.i.) |
| --- | --- |
| Composition F₂: | 6.9 MPa (1,000 p.s.i.) |

EXAMPLE 7

Cement grouts having a density of from 1.20 to 1.60 and containing fresh water were prepared in accordance with the present invention as set forth below.

| Composition C₁ having a density of 1.20 | |
| --- | --- |
| Cement G: | 133 g |
| Silica fumes: | 46.8 g |
| Polyethylene imine: | 57 ml |
| Dispersant: | 2 g |
| Fresh water | 482 ml. |
| Composition C₂ having a density of 1.30 | |
| Cement G: | 184 g |
| Silica fumes: | 73.5 g |
| Polyethylene imine: | 50 ml |
| Dispersant: | 3.7 g |
| Fresh water | 457 ml. |
| Composition C₃ having a density of 1.40 | |
| Cement G: | 264 g |
| Silica fumes: | 106 g |
| Polyethylene imine: | 47 ml |
| Dispersant: | 5.2 g |
| Fresh water | 420 ml. |
| Composition C₄ having a density of 1.50 | |
| Cement G: | 345 g |
| Silica fumes: | 121 g |
| Polyethylene imine: | 43 ml |
| Dispersant: | 6.9 g |
| Fresh water | 392 ml. |
| Composition C₅ having a density of 1.60 | |
| Cement G: | 413 g |
| Silica fumes: | 145 g |
| Polyethylene imine: | 40 ml |
| Dispersant: | 6.2 g |
| Fresh water | 362 ml. |

Figure 1:
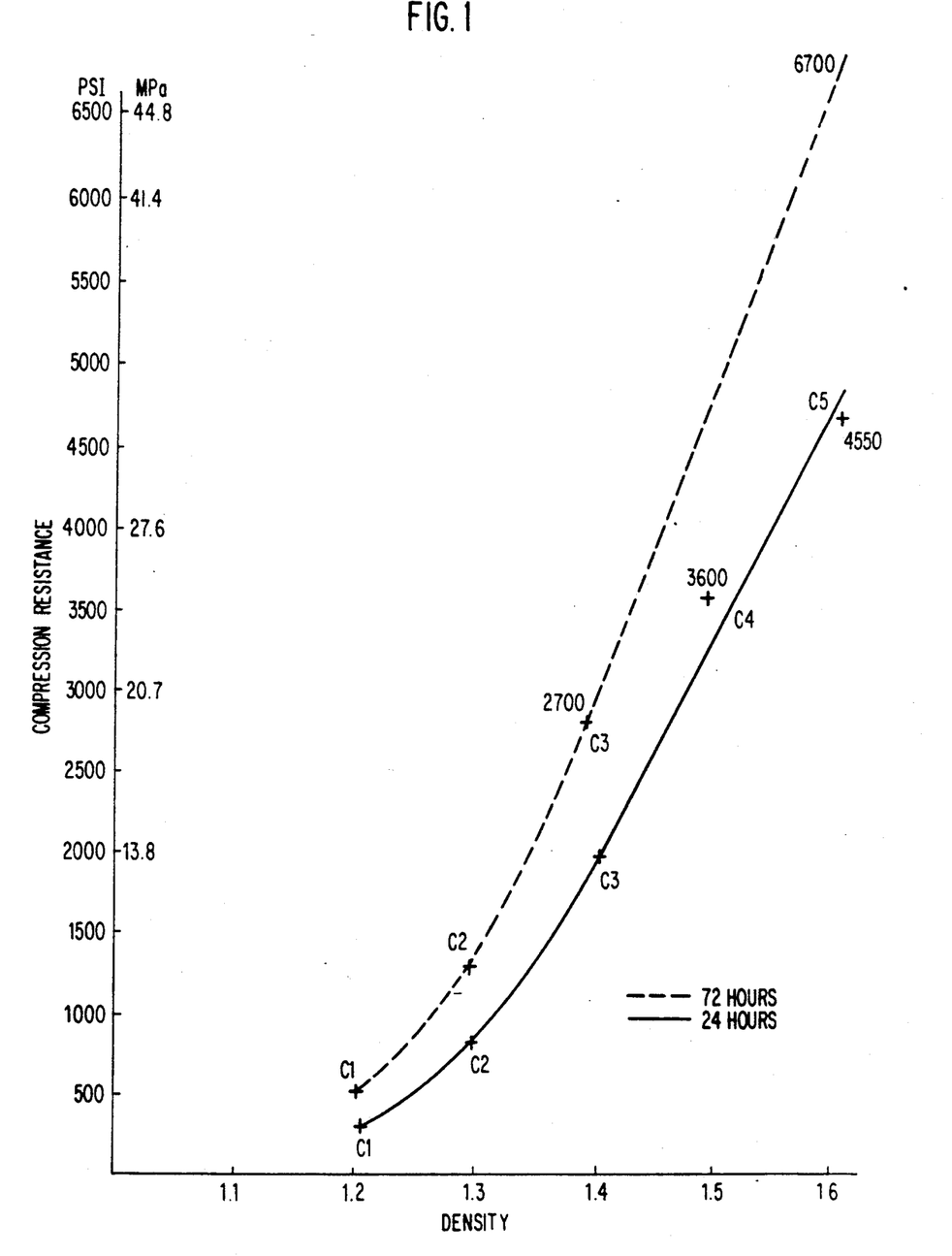
FIG. 1 represents a curve pertaining to compression tests performed on cement grout prepared in accordance with the invention.

These compounds were subjected to compression-resistance tests at 60° C. after 24 and 72 hours, respectively. The results of these tests as a function of density are shown in FIG. 1 of the attached drawings.

EXAMPLE 8

Gas-impermeability tests were also performed. The cement grouts described below were tested in an apparatus which is shown diagrammatically in FIG. 2, simulating gas flow. The test results and compositions are set forth below and referenced by the Figures.

Figure 2:
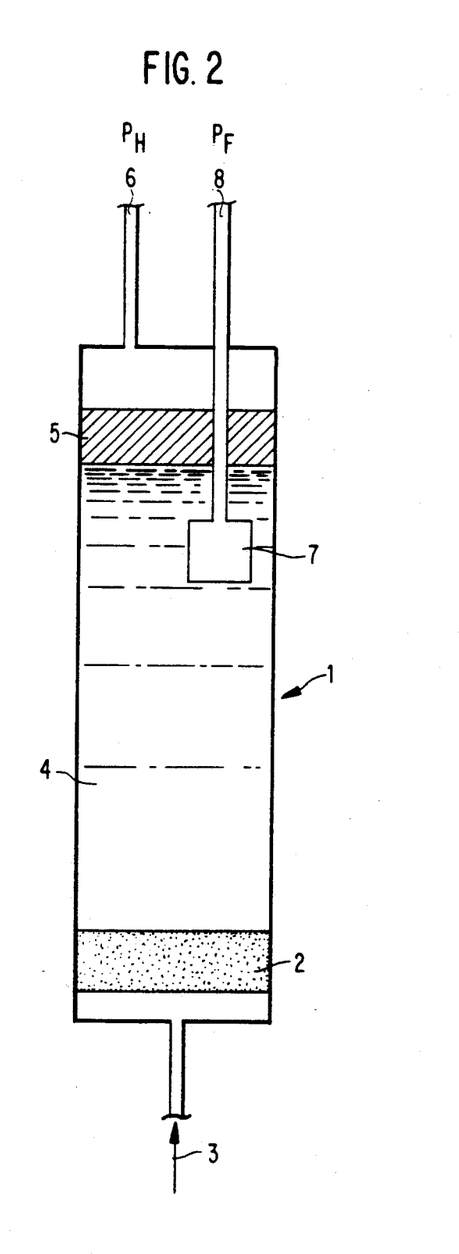
FIG. 2 is a diagram of an apparatus used for testing gas flow through cement.

FIG. 2 comprises a metal sleeve (1) which is closed off at its lower end by permeable rock (2) which allows the filtrate to flow and gas (helium) pressure to be applied through the duct (3). The sleeve (1) is filled with grout (4) and closed by means of a piston (5) whose function is to transmit hydrostatic pressure (6). A gas-detection system connected to a low-pressure permeable formation is represented at (7).

Hydrostatic pressure, the pressure of the upper formation, and gas pressure are applied in succession. Then, the gas pressure feed and the feed simulating pressure exerted by the upper formation are closed.

The existence of gas flow is checked by the potential lowering of helium pressure at (3), which simulates the pressure of a gas area, and the increase of the pressure exerted by the upper formation or water-bearing pressure at (8).

Gas-flow tests were conducted using this apparatus on various cement grouts prepared in accordance with the present invention under various pressure and temperature conditions and after varying intervals.

Figure 3:
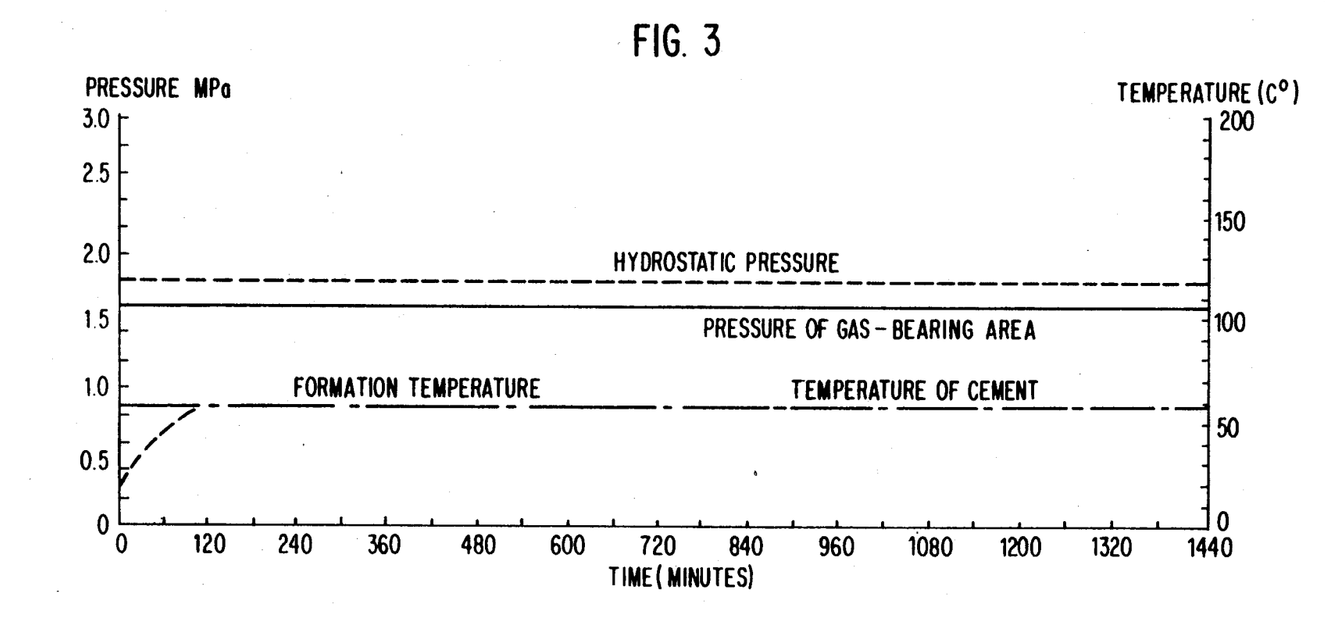
FIGS. 3 to 8 illustrate the results of gas impermeability testing for cement grout prepared in accordance with the present invention as described in Example 8 herein.

The compositions tested and the results of these tests are shown in FIGS. 3 to 8, which refer to the following tests:

FIG. 3

Composition tested: Cement grout was prepared having a density of 1.40 and containing cement G, water, 35 weight % silica fumes with respect to the weight of the cement, and 10% polyethylene imine with respect to the weight of the water, to which a retardant and a dispersant were added. The results are shown in FIG. 3 for the following test conditions:

| Test Conditions: | |
| --- | --- |
| Hydrostatic pressure: | 1.8 MPa |
| Pressure generated by the upper formation or water-bearing area | 0.6 MPa |
| Pressure generated by the lower formation or gas area | 1.6 MPa |
| Temperature of the formation or of the cement | 49° C. |

Figure 4:
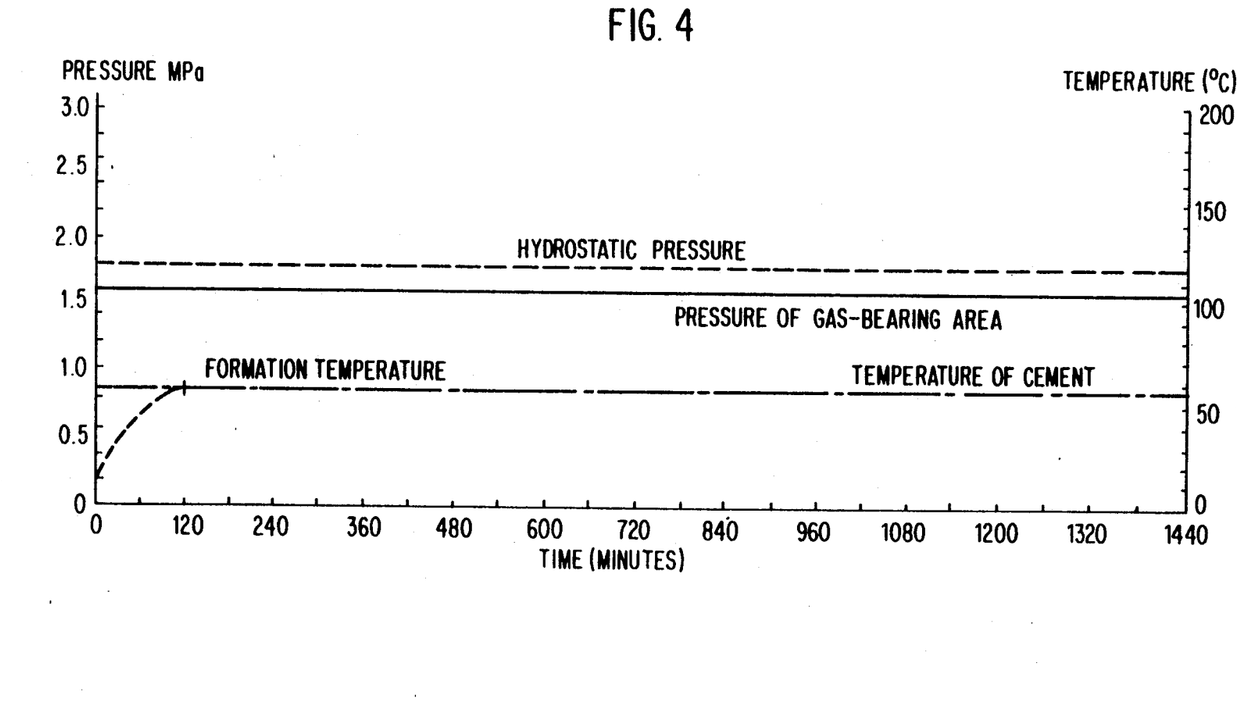

FIG. 4

Composition tested: Identical to FIG. 3, except the polyethylene imine concentration was 15 weight % with respect to the weight of the water.
Test conditions: Identical to FIG. 3.

Figure 5:
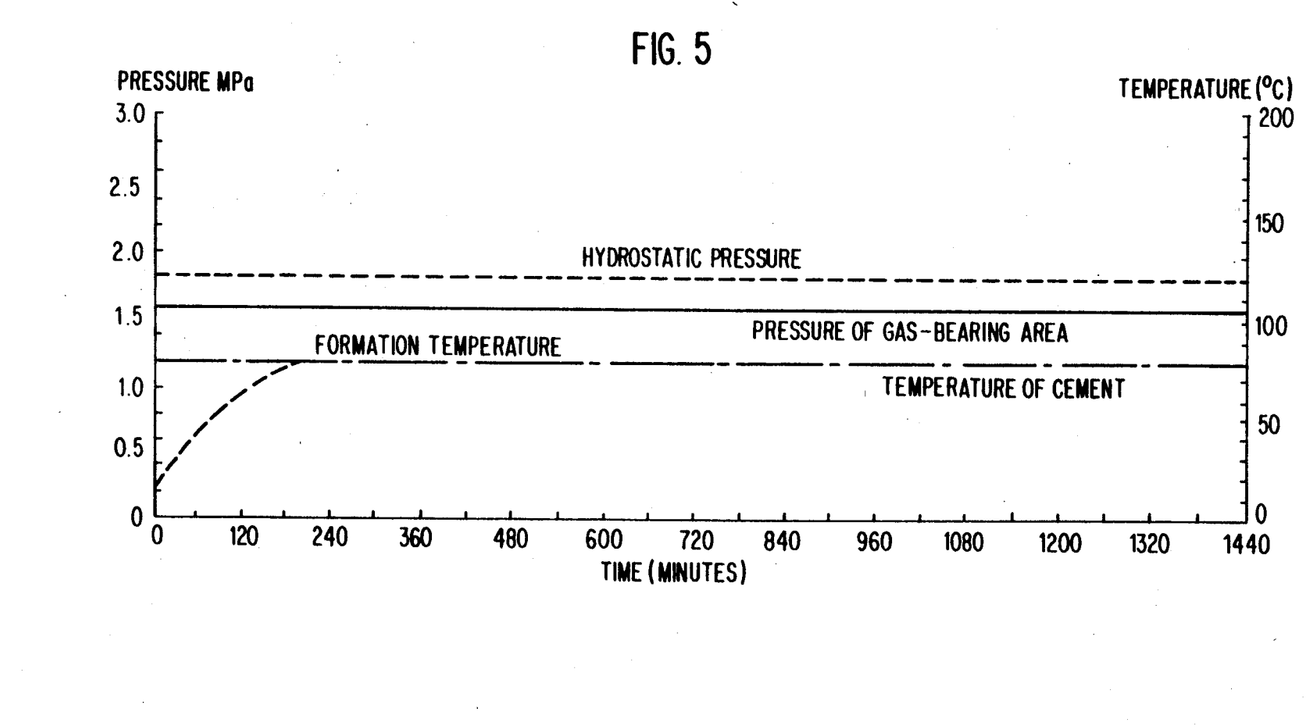

FIG. 5

Composition tested: Identical to FIG. 4.
Test conditions: Identical to FIG. 4, except the cement temperature was 80° C.

Figure 6:
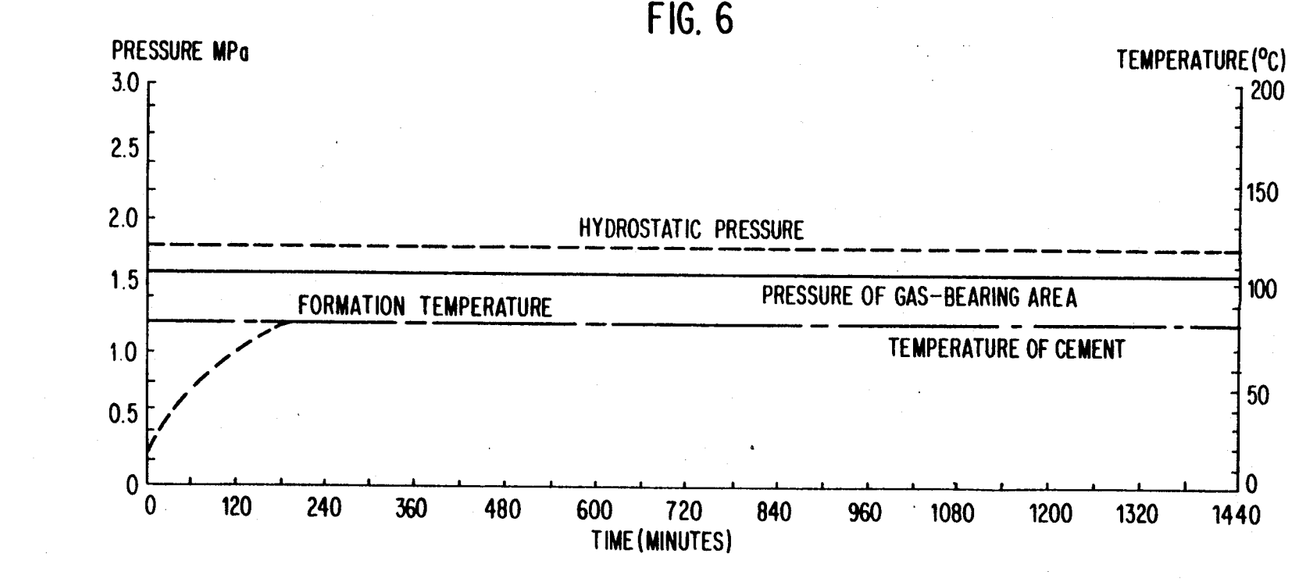

FIG. 6

Composition tested: Identical to FIGS. 4 and 5, except the polyethylene imine content was 10 weight % with respect to the weight of the water.
Test conditions: Identical to FIG. 5.

Figure 7:
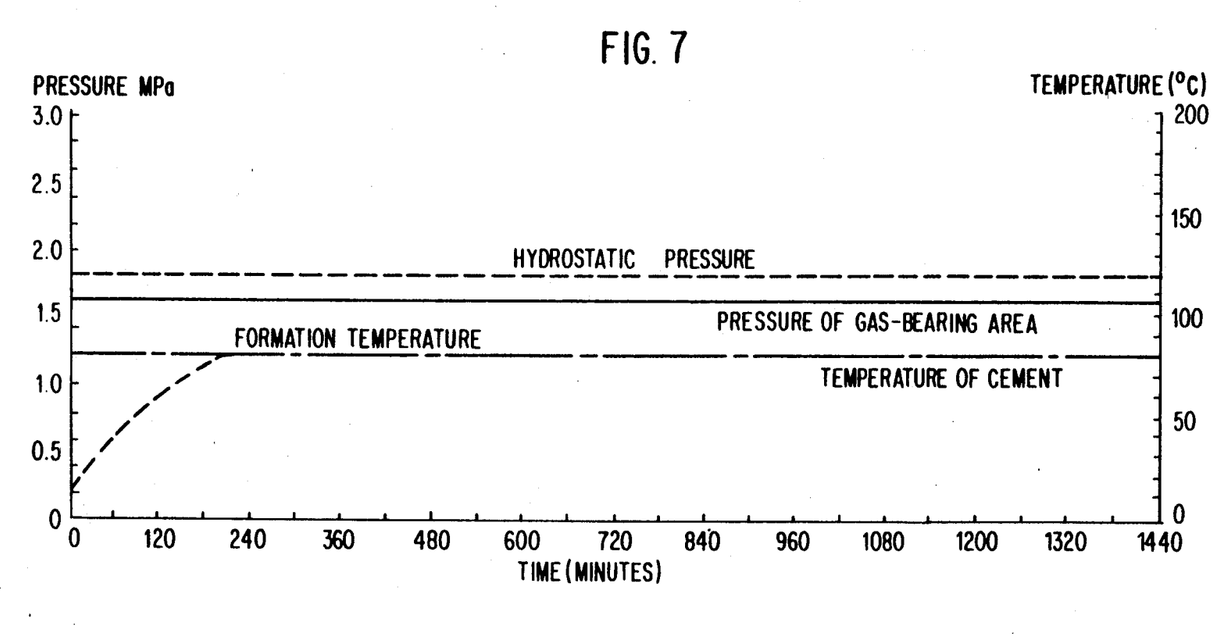

FIG. 7

Composition tested: Identical to FIG. 6, except the density of the grout was 1.60.
Test conditions: Identical to FIG. 6.

Figure 8:
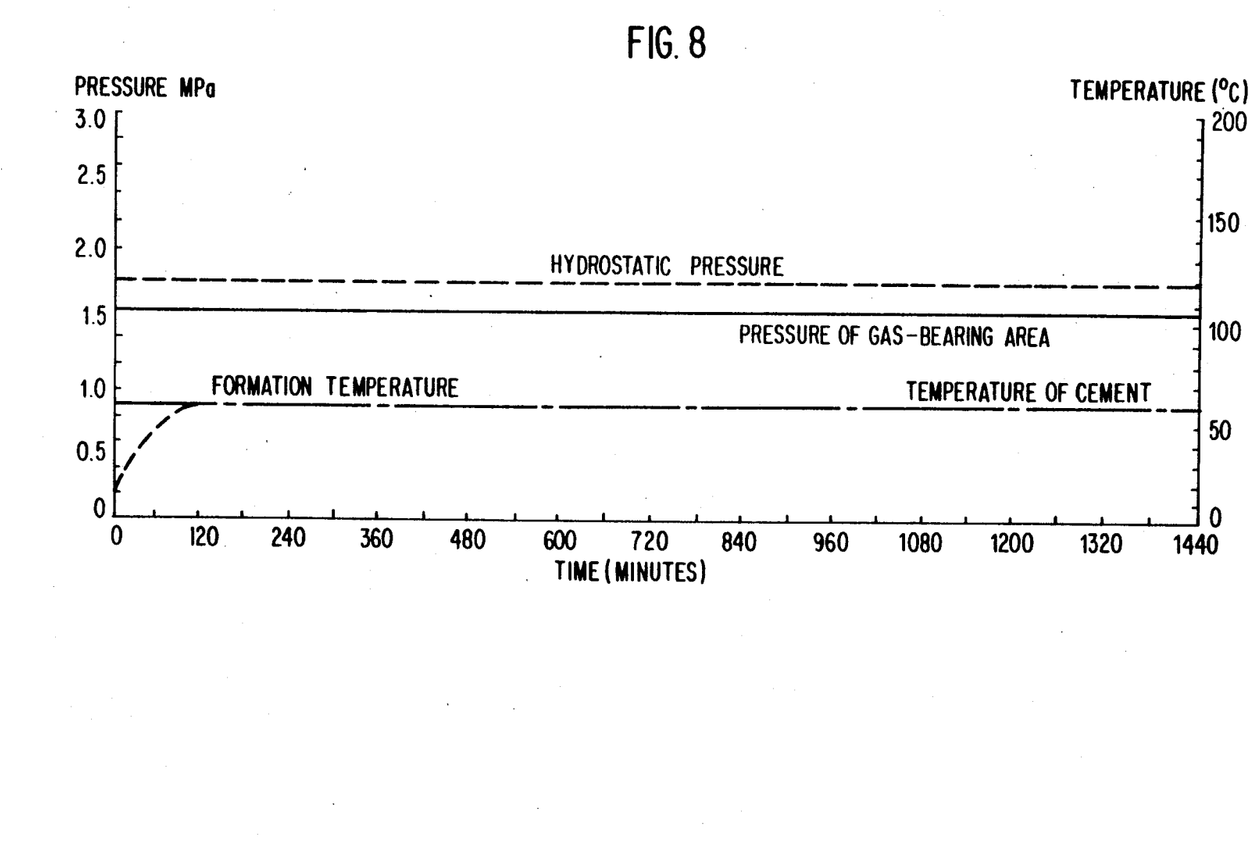

FIG. 8

Composition tested: Identical to FIG. 7.
Test conditions: Identical to FIG. 7, except the cement temperature was 49° C.

In all of these tests (results shown in FIGS. 3 to 8), no variation over time of the pressure of the gas-bearing area or of the upper or lower areas was observed. Thus, no gas flow was occurring.

EXAMPLE 9

Cement grouts having a density of 1.40 were prepared in accordance with the present invention to measure permeability.

| Composition: | |
| --- | --- |
| Cement G: | 272 g |
| 50/50 suspension of microsilica in water: | 190 g |
| Polyethylene imine: | 47 ml |
| Dispersant: | 4 g |
| Fresh water: | 327 ml |

A test lasting 72 hours and at a temperature of 60° C. was conducted using this composition. Then, core sampling was performed on a specimen measuring 39 mm in diameter, and the permeability to filtered distilled water injected under a pressure of 80 bars was measured.

A permeability of less than 0.001 millidarcy was observed, whereas conventional cement has a permeability of 0.0004 millidarcy.

EXAMPLE 10

Cement grouts having a density of 1.40 were prepared in accordance with the present invention, to evaluate temperature resistance under a compression-resistance test.

| Composition tested: | |
| --- | --- |
| Cement G: | 272.6 g |
| Silica fumes: | 109.1 g |
| Polyethylene imine: | 44.5 ml |
| Dispersant: | 5.4 g |
| Fresh water: | 440 ml |

The results are set forth below.

| Test conditions | 24 hours | 72 hours |
| --- | --- | --- |
| 130° C. | 13.22 Mpa (1,920 p.s.i.) | 13.66 MPa (1,980 p.s.i.) |
| 21 MPa 60° C. | 2,015 p.s.i. | 1,975 p.s.i. |

The composition tested, which is exposed to a temperature of 130° C. for 24 and 72 hours, respectively, give rise to very high compression-resistance results compared with those obtained at 60° C. and without change of size of the specimens tested. (Above 110° C., fine sand or silica flour must be added to avoid the drop of resistance to compression.)

EXAMPLE 11

Cement grouts were prepared in accordance with the present invention to evaluate their reactivity to retardants.

In the petroleum industry, it is important to use hardening retardants so as to able to apply cement grouts under varying depth, temperature, and pressure conditions in the various wells.

Figure 9:
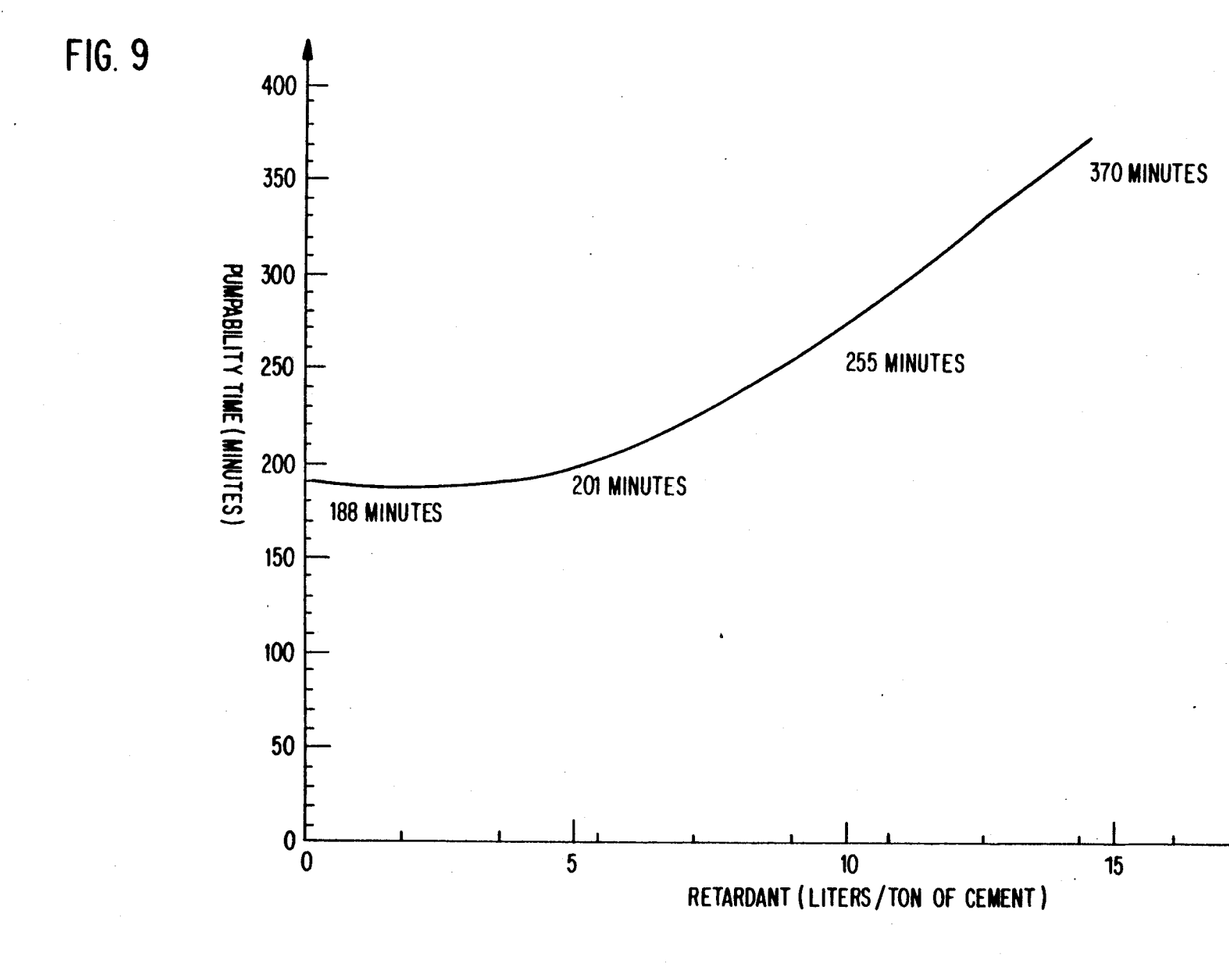
FIGS. 9 to 11 illustrate the results of testing to evaluate the reactivity of cement grouts to retardants in accordance with the present invention as described in Example 1 herein.
Figure 10:
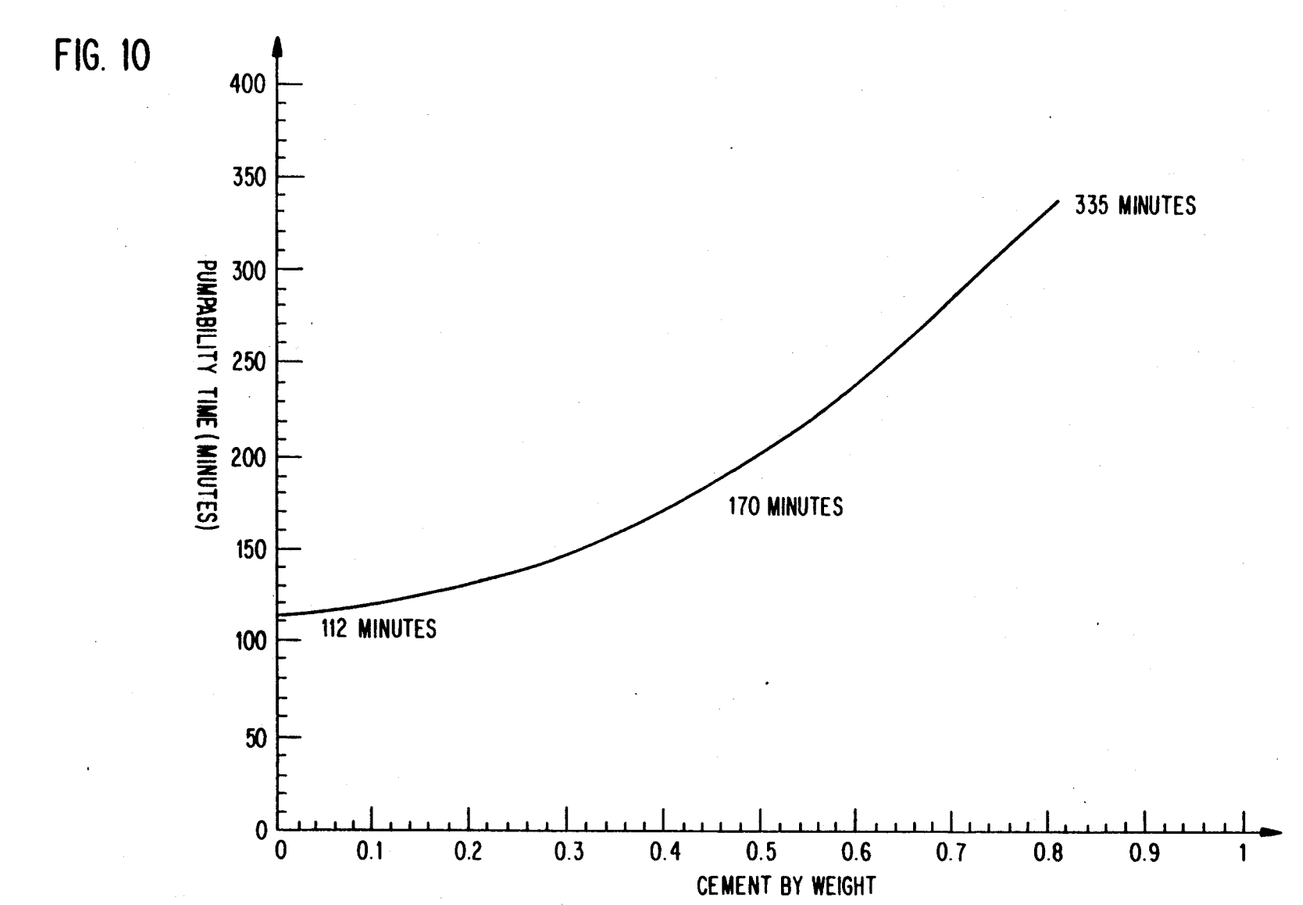
Figure 11:
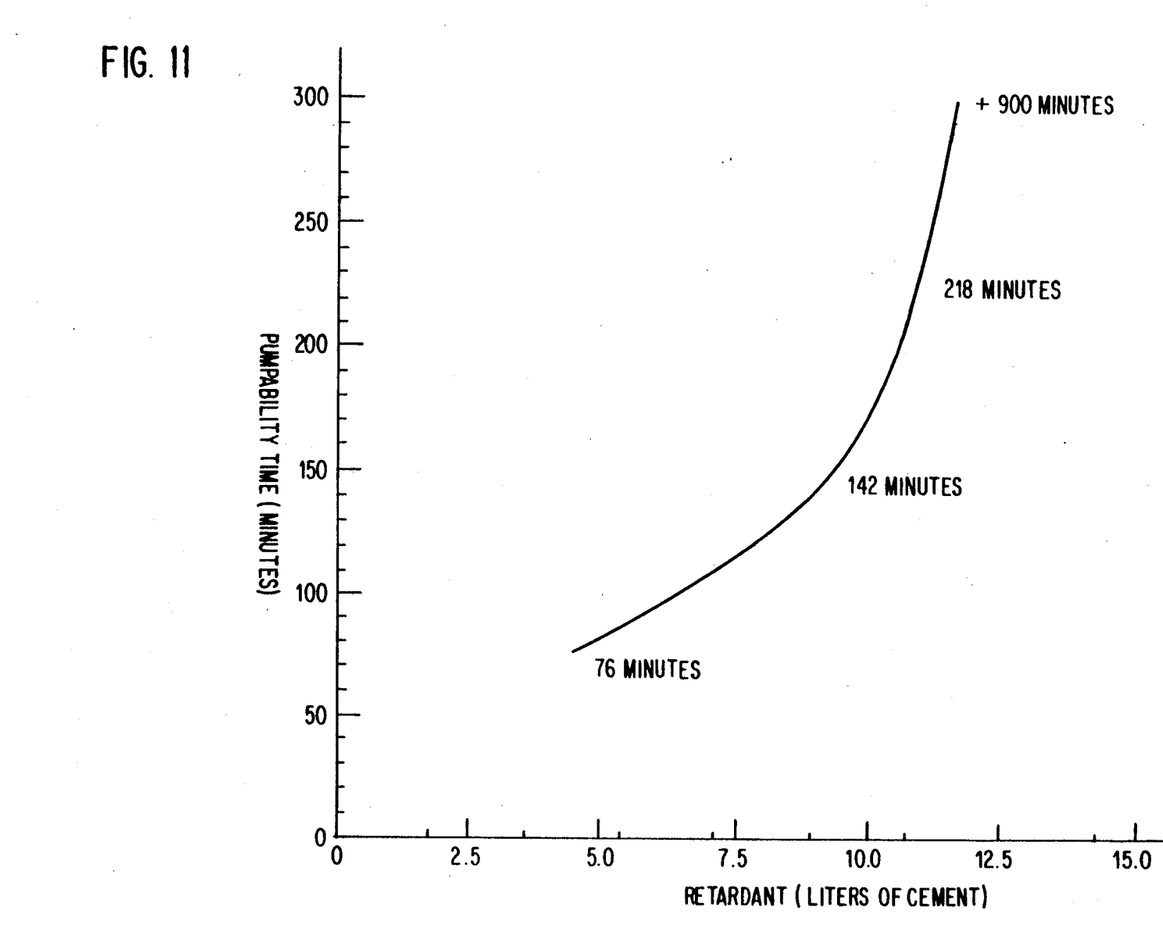

Two conventionally-used, medium-temperature type retardants, one a liquid and the other a solid, and a high-temperature type liquid were tested. Their adaptability to conditions of use is illustrated in FIGS. 9 to 11, which pertain to the following tests:

FIG. 9

Composition tested

Class G cement
Fresh water
Silica fumes: 35% of cement weight
Polyethylene imine: 10% of water weight
Powdered dispersant agent: 1.5%
Liquid retardant

TEST CONDITIONS

Temperature: 54° C.
Pressure: 43.5 MPa

The curve illustrates the variation in pumpability time, expressed in minutes, as a function of the retardant content expressed in liters per ton of cement.

FIG. 10

Composition Tested

Class G cement
Fresh water
Silica fumes: 40% of cement weight
Powdered dispersant: 2%
Powdered retardant Test Conditions Temperature: 54° C.
Pressure: 43.5 MPa The curve illustrates the variation in pumpability time, expressed in minutes, as a function of the retardant content expressed as a % of cement weight.

FIG. 11

Composition Tested

Class G cement
Fresh water
Silica fumes: 35% of cement weight
Polyethylene imine: 10% of water weight
Powdered dispersant: 2%
Liquid retardant Test Conditions Temperature: 90° C.
Pressure: 69 MPa The curve illustrates the variation in pumpability time, expressed in minutes, as a function of the liquid retardant content expressed in liters per ton of cement.

In the petroleum industry, it is important to use hardening retardants in order to be able to apply cement grouts under varying depth, temperature, and pressure conditions in the various wells.

What is claimed is:

1. A lightened, gas-impermeable cement grout which comprises hydraulic cement, water, silica fumes in an amount of from about 5 to about 65 weight % based on the weight of the cement, and at least one polyethylene imine having a molecular weight of between about 600,000 and about 1,000,000 in an amount of from about 1 to about 25% weight % based on the weight of the water.

2. A lightened, gas-impermeable cement grout according to claim 1, wherein the weight % of silica fumes is between 30 and 65.

3. A lightened, gas-impermeable cement grout according to claim 1, wherein the weight % of silica fumes is between 25 and 40.

4. A lightened, gas-impermeable cement grout according to claim 1, wherein the weight % of the at least one polyethylene imine is between 5 and 15.

5. A lightened, gas-impermeable cement grout according to claim 1, wherein the silica fumes are added in the form of a stable suspension.

6. A lightened, gas-impermeable cement grout according to claim 5, wherein the silica fumes are in a compressed form.

7. A lightened, gas-impermeable cement grout according to claim 5, wherein the silica fumes are under pressure.

8. A lightened, gas-impermeable cement grout according to claim 1, wherein the silica fumes are microparticles recovered in fumes emitted by electric ovens used for manufacture of silicon and its alloys.

9. A lightened, gas-impermeable cement grout according to claim 1, wherein the microparticles have a maximum size of between about 0.01 microns and about 1 micron.

10. A lightened, gas-impermeable cement grout according to claim 1, wherein the microparticles have an average size of less than 1.0 micron.

11. A lightened, gas-impermeable cement grout according to claim 1, wherein the microparticles have a specific surface area of between about 15 and about 25 $m^2/g$.

12. A lightened, gas-impermeable cement grout according to claim 1, wherein the cement is an artificial Portland cement.

13. A lightened, gas-impermeable cement grout according to claim 1, wherein the water is selected from the group consisting of fresh water and sea water.

14. A lightened, gas-impermeable cement grout according to claim 1, wherein the polyethylene imine is an aqueous solution.

15. A process for preparing a lightened, gas-impermeable cement grout comprising hydraulic cement, water, silica fumes and at least one polyethylene imine, comprising the following steps in succession:

a) combining the at least one polyethylene imine with the water, wherein the at least one polyethylene imine has a molecular weight of between about 600,000 and about 1,000,000 and is used in an amount of from about 1 to about 25 weight % of the weight of the water, to form a water/polyethylene imine mixture;

b) adding the silica fumes to the water/polyethylene imine mixture to form a suspension;

c) mixing a hydraulic cement into the suspension, wherein the silica fumes are added in an amount of from about 5 to about 65 weight % based on the weight of the hydraulic cement.

16. A process according to claim 15, wherein the weight % of silica fumes is between 30 and 65.

17. A process according to claim 15, wherein the weight % of silica fumes is between 25 and 40.

18. A process according to claim 15, wherein the weight % of the at least one polyethylene imine is between 5 and 15.

19. A process according to claim 2, wherein the silica fumes are added in the form of a stable suspension.

20. A process according to claim 19, wherein the silica fumes are in a compressed form.

21. A process according to claim 19, wherein the silica fumes are under pressure.

22. A process according to claim 15, wherein the polyethylene imine is incorporated into the water as an aqueous solution.

23. A process according to claim 15, wherein in step a) the polyethylene imine is incorporated into the water in the presence of an anti-foaming product.

24. A process according to claim 15, wherein said process further comprises adding a dispensing agent and a retarding agent to the suspension prior to step c).

25. A process for cementation of a hydrocarbon well comprising injecting a lightened, gas-impermeable cement grout into the well at the periphery of tubes of the well and over at least one portion of the length of the tubes, between the tubes and adjoining group, said cement grout comprising hydraulic cement, water, silica fumes in an amount of from about 5 to about 65 weight % based on the weight of the cement, and at least one polyethylene imine having a molecular weight of between about 600,000 and about 1,000,000 in an amount of from about 1 to about 25% weight % based on the weight of the water.

26. A lightened, gas-permeable cement grout according to claim 1, wherein the lightened gas-permeable cement grout has a density between 1 and 1.6 g/cm$^3$.

27. A process according to claim 15, wherein the lightened gas-permeable cement grout has a density between 1 and 1.6 g/cm$^3$.

28. A process according to claim 25, wherein the lightened gas-permeable cement grout has a density between 1 and 1.6 g/cm$^3$.

* * * * *